United States Patent [19]
Baer

[11] Patent Number: 5,245,874
[45] Date of Patent: Sep. 21, 1993

[54] TOTAL PRECIPITATION GAUGE WITH FLOAT SENSOR

[75] Inventor: John S. Baer, Bar Harbor, Me.

[73] Assignee: RainWise, Inc., Bar Harbor, Me.

[21] Appl. No.: 867,315

[22] Filed: Apr. 10, 1992

[51] Int. Cl.⁵ .................. G01F 23/30; G01F 23/40; G01W 1/14

[52] U.S. Cl. .................... 73/313; 73/309; 73/319; 73/170.22

[58] Field of Search ............... 73/309, 313, 319, 171; 116/228

[56] References Cited

U.S. PATENT DOCUMENTS

| | | | |
|---|---|---|---|
| 572,321 | 12/1896 | Van Vleck | 116/228 |
| 2,118,459 | 5/1938 | Chappell et al. | 73/171 |
| 2,497,759 | 2/1950 | Cappleman . | |
| 2,701,472 | 2/1955 | Allen et al. . | |
| 2,789,431 | 4/1957 | Wong . | |
| 2,908,165 | 10/1959 | Dispenza | 73/171 |
| 3,148,542 | 9/1964 | Clift, Jr. | 73/313 |
| 3,153,931 | 10/1964 | Klemmetsen | 73/309 |
| 3,229,519 | 1/1966 | Nillson | 73/313 |
| 3,393,559 | 7/1968 | Oviatt | 73/171 |
| 3,487,684 | 1/1970 | Chadwick . | |
| 3,558,861 | 1/1971 | Collins et al. | 73/313 |
| 3,710,613 | 1/1973 | Innes et al. | 73/319 |
| 4,065,968 | 1/1978 | Sunagawa | 73/313 |
| 4,233,841 | 11/1980 | Abele | 73/171 |
| 4,292,843 | 10/1981 | Luchessa et al. | 73/171 |
| 4,342,224 | 8/1982 | Hara et al. | 73/319 |
| 4,397,183 | 8/1983 | Ballou et al. | 73/309 |
| 4,665,743 | 5/1987 | Masniere et al. | 73/171 |
| 4,702,107 | 10/1987 | Guerrini et al. | 73/319 |
| 4,836,018 | 6/1989 | Dispenza | 73/171 |
| 4,922,226 | 5/1990 | Hsieh et al. | 73/309 |

FOREIGN PATENT DOCUMENTS

| | | | |
|---|---|---|---|
| 0119288 | 7/1984 | Japan | 73/171 |
| 0568844 | 8/1977 | U.S.S.R. | 73/309 |
| 1418631 | 8/1988 | U.S.S.R. | 73/171 |
| 0003168 | of 1894 | United Kingdom | 73/171 |
| 1297943 | 11/1972 | United Kingdom | 73/171 |

OTHER PUBLICATIONS

Belfort Instrument Company Baltimore, Maryland 1986-1988 Catalog pp. 46-60 (1986).

*Primary Examiner*—William A. Cuchlinski, Jr.
*Assistant Examiner*—Diego F. F. Gutierrez
*Attorney, Agent, or Firm*—Daniel H. Kane

[57] ABSTRACT

A total precipitation gauge (10) incorporates a float gauge (16) extending downward to a liquid level (18) in a precipitation storage container. The float gauge (16) is formed with an elongate stillwell (20) extending into the liquid level (18), a float element (22) suspended in the stillwell (20) for rising and falling motion within the stillwell in response to the liquid level, and an elongate code bearing surface (24) coupled to the float (22). A code sensor (34) senses motion of the code bearing surface (34) for generating electrical signals (35) corresponding to motion of the float element and liquid level. The code bearing surface is a flexible coded strip (24) secured at one end to the float element (22) and at the other end to a spring loaded reel (25). The spring force of the spring loaded reel (25) is less than the weight of the float element (22) and ballast (26). The code sensor (34) is an optical interruption sensor with first and second optical sensors (a1,a2) coupled in a quadrature relationship with respect to the coded strip (24) to determine direction of motion of the coded strip (24). The total precipitation gauge may be constructed in the configuration of a removable and replaceable cover (12) for fitting over a precipitation storage container (14). The cover (12) includes a collector passageway (15) for proportionately restricting precipitation passing into the precipitation storage container (14).

12 Claims, 4 Drawing Sheets

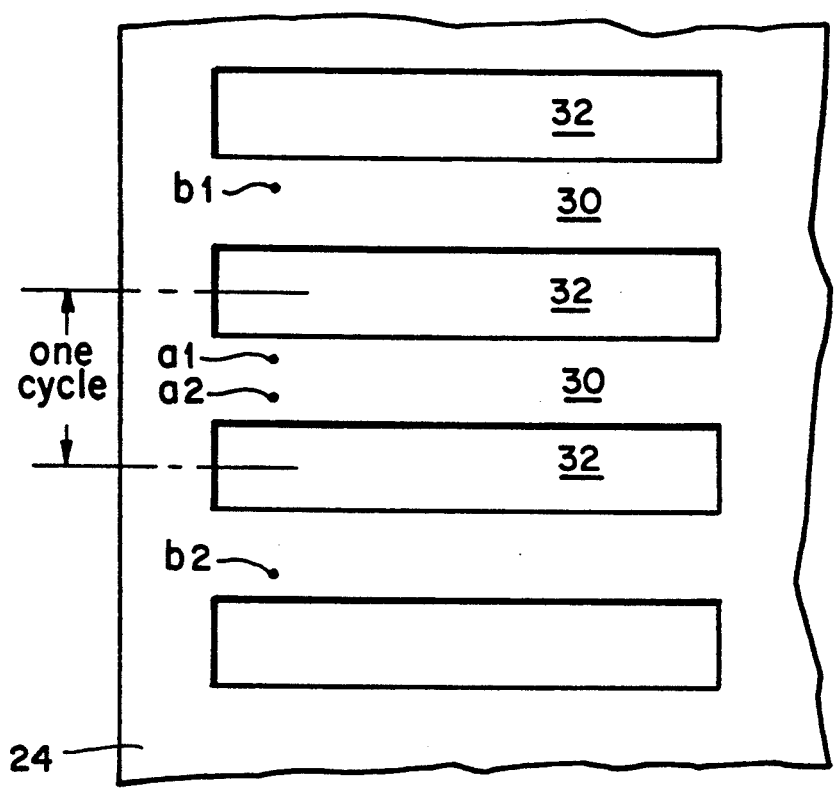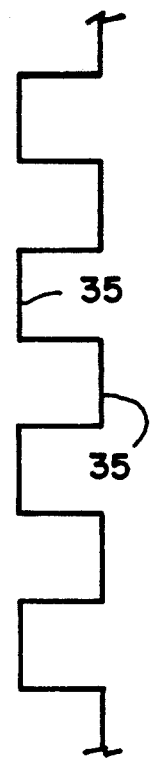
FIG. 4  FIG. 4A
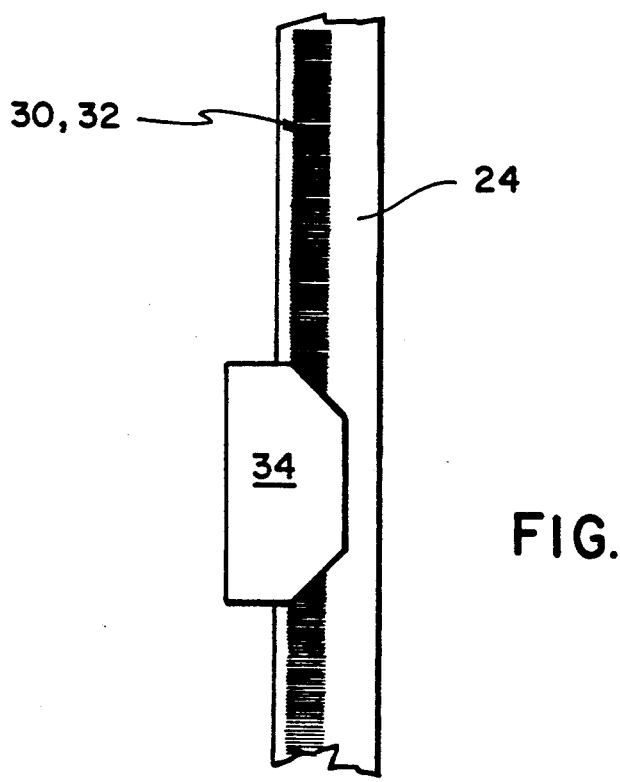
FIG. 5

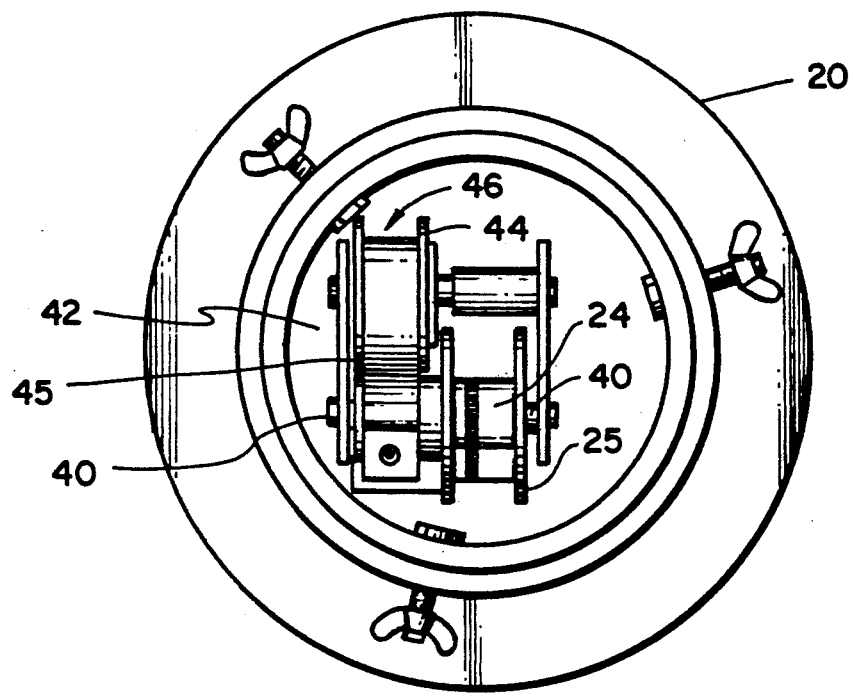
FIG. 6
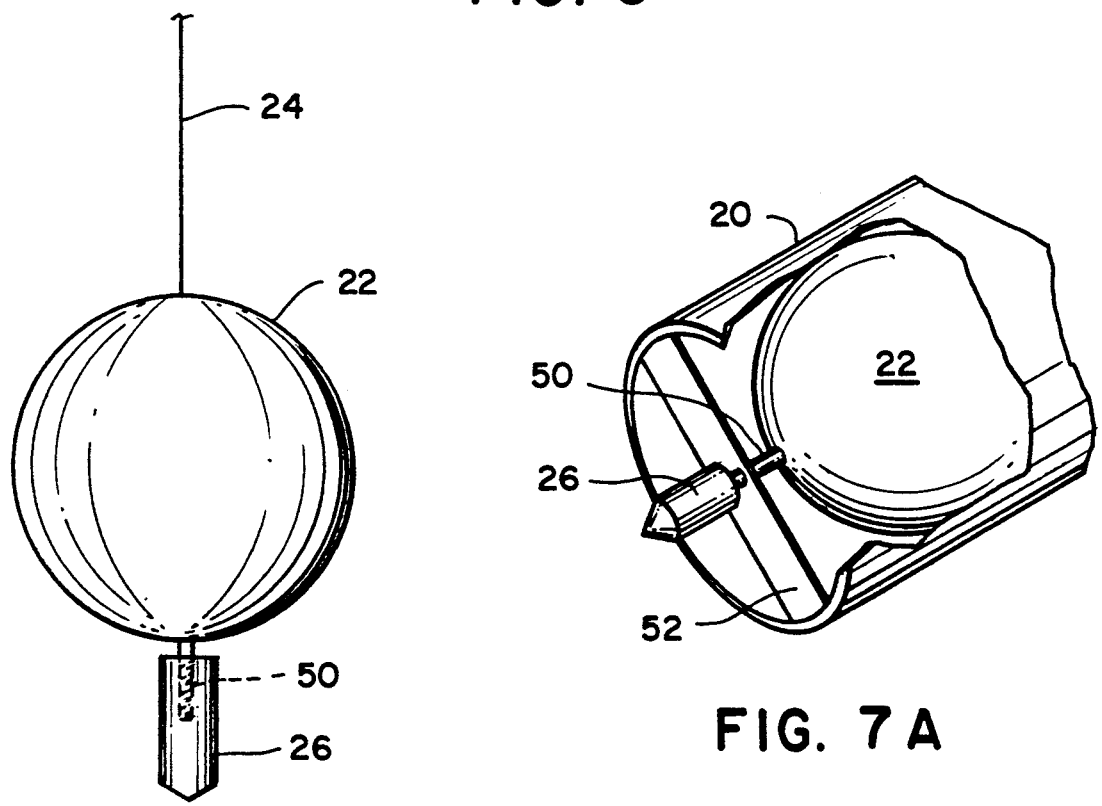
FIG. 7
FIG. 7A

TOTAL PRECIPITATION GAUGE WITH FLOAT SENSOR

TECHNICAL FIELD

This invention relates to a new total precipitation gauge for accumulating and measuring total precipitation over an extended period of time. The total precipitation gauge is applicable for use at remote locations and generates electrical signals for transmission or recording. The total precipitation guage includes a collector which proportionately restricts precipitation passing into a storage container. A new float gauge extends down to a liquid level in the container with digital code sensing of the liquid level for improved resolution. The total precipitation gauge may be incorporated in a removable and replaceable cover for fitting on a relatively large capacity storage and shipping container.

BACKGROUND ART

Prior art rain gauges and total precipitation gauges have incorporated the principle of using a relatively small diameter collector leading to a larger diameter tank for proportionately restricting accumulation of precipitation and increasing capacity. Such precipitation gauges typically operate and measure cumulative precipitation on the basis of weight. The weighing mechanisms may be of limited resolution, may require periodic disposal of liquid, and may not conveniently generate electrical signals for recording or transmission. The capacity of such precipitation gauges is not well adapted for use in remote areas over long periods of time without attention. Nor do such rain gauges generally advert to the advantages afforded by float gauge sensing to achieve greater resolution.

A search was conducted in the U.S. Patent records of the U.S. Patent and Trademark Office directed to total precipitation gauge patents pertinent to features related to the present invention such as using large capacity storage containers, incorporating the total precipitation gauge in a removable and replaceable cover, and using float gauge sensing for more accurate measurement of accumulated precipitation. The results of this search and the identification and discussion of U.S. Patent references found in the search are set forth in a separate Information Disclosure Statement, part of the file history of this patent application.

OBJECTS OF THE INVENTION

It is an object of the present invention is to provide a new total precipitation gauge incorporating a low maintenance float gauge sensor for more accurate measurement of accumulated precipitation. The invention provides a new float gauge sensor using optical sensing of a digital code for greater resolution and for providing electrical signals for transmission and recording.

Another object of the invention is to provide a new and improved total precipitation gauge with large capacity storage suitable for use at remote locations without tending over extended periods of time. The large capacity storage container according to the invention may be used for long term accumulation of precipitation and as a shipping container for proper disposal.

A further object of the invention is to provide a total precipitation gauge incorporated in a removable and replaceable cover for fitting over a large capacity cumulative precipitation container such as, for example, a standard size fifty-five gallon drum. The cover may therefore be removable and replaceable on different storage containers and may be replaced by a sealed cover for shipping.

DISCLOSURE OF THE INVENTION

In order to accomplish these results, the invention provides a total precipitation gauge incorporating a float gauge with an elongate stillwell extending down from the cover to a liquid level in a precipitation storage container. A float element is suspended in the stillwell for rising and falling motion within the stillwell in response to the liquid level in the precipitation storage container. An elongate code bearing surface is coupled to the float element. A code sensor secured to the cover is constructed for sensing motion of the code bearing surface and for generating electrical signals corresponding to motion of the float element.

In the preferred example embodiment the elongate code bearing surface is in the form of a flexible coded strip secured at one end to the float element. A spring loaded retractor is secured to the cover and the other end of the flexible coded strip is secured to the spring loaded retractor. In other words, the retractor provides a guide for the other end of the coded strip. In the preferred example, the spring loaded retractor is a spring loaded reel for winding up the flexible coded strip when the float element is rising with the liquid level in a precipitation storage container.

The spring loaded reel is fitted with a spring having a selected spring force. The float element is fitted with a removable weight ballast constructed so that the weight of the float element and ballast exceeds the spring force in the measurement range of the float gauge. As a result the spring loaded reel winds up the flexible coded strip when the liquid level in a precipitation storage container is rising and unwinds and extends the flexible code strip when the liquid level is falling. A feature of this arrangement is that the total precipitation gauge can provide an accurate measure of cumulative precipitation taking into account evaporation losses.

According to the new float gauge the code sensor is an optical interruption device with first and second optical sensors coupled in a quadrature relationship with respect to the coded strip. The optical sensors generate first and second electrical signals in a quadrature phase relationship to determine direction of motion of the coded strip and whether the liquid level is rising or falling.

To this end the coded strip according to the best mode is formed with alternating opaque lands and relatively transparent spaces having approximately equal width. The first and second optical sensors are spaced apart along the coded strip in successive quadratures of respective land and space cycles of the coded strip.

According to another feature of the invention, the total precipitation gauge may be in the form of a removable and replaceable cover for fitting over a precipitation storage container. The cover includes a collector for passing precipitation into the precipitation storage container and a float gauge extending downward from the cover to a liquid level in the precipitation storage container over which the cover is fitted. The collector is formed with a cross section area less than the cross section area of the storage container for proportionately restricting precipitation passing into the precipitation storage container.

Other objects, features and advantages of the invention are apparent in the following specification and accompanying drawings.

BRIEF DESCRIPTION OF THE DRAWINGS

FIG. 4 is a detailed fragmentary plan view of a portion of the flexible coded strip indicating the quadrature positioning of the first and second optical sensors; and FIG. 4A is a diagrammatic view of a corresponding square wave signal.

FIG. 5 is a detailed fragmentary side view of the arrangement of the optical interruption device containing first and second optical sensors in quadrature relationship with respect to the flexible code strip.

FIG. 6 is a detailed fragmentary plan view from above of the spring loaded reel for winding up and unwinding the flexible coded strip and the adjacent wound spring for spring loading the reel.

FIG. 7 is a detailed fragmentary side view of the float element with weight ballast coupled directly to the float element for operation of the float gauge.

FIG. 7a is a detailed fragmentary view looking at the bottom of the stillwell of the float gauge and showing the float element secured to a shipping strap by the removable weight ballast in preparation for shipping.

Description of Preferred Example Embodiments and Best Mode of the Invention

Figure 1:
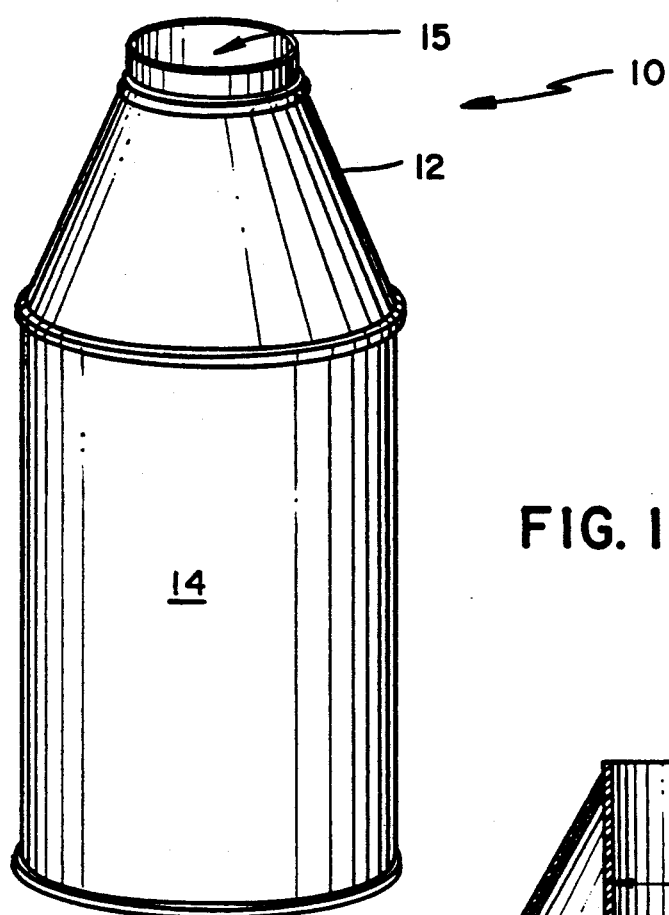
FIG. 1 is a perspective view of the total precipitation gauge fitted over a standard size open end fifty-five gallon stainless steel drum.
Figure 2:
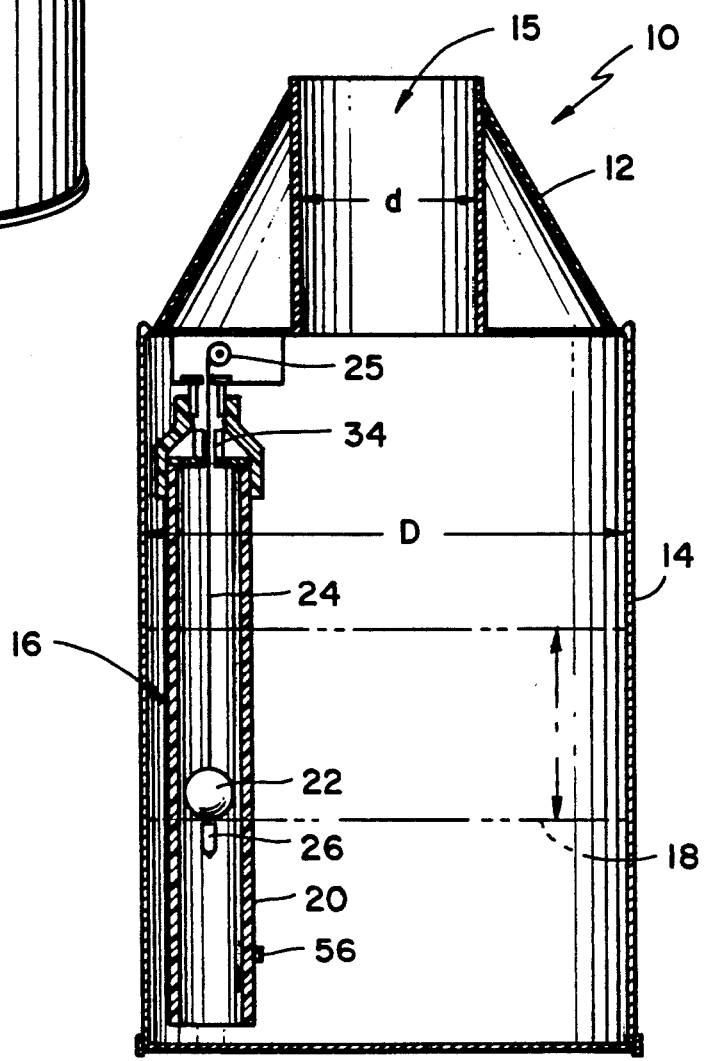
FIG. 2 is a side cross section view through the total precipitation gauge showing the operative elements of the float gauge extending down from the cover fitted over a precipitation storage container.

An assembled total precipitation gauge 10 according to the invention is illustrated in FIGS. 1 & 2. The total precipitation gauge is constructed in the configuration of a cover 12 which is fitted over the open end of a standard size fifty-five gallon drum 14. Drum 14 provides the precipitation storage container. The fifty-five gallon drum precipitation storage container 14 may be formed of stainless steel with smooth sides.

The cover 12 is formed with a circular collector and collector orifice or collector passageway 15 of relatively smaller inner diameter "d" and cross section area "a". The collector restricts precipitation passing into the storage container 14 which has a relatively larger inner diameter "D" and cross section area "A". An actual increment of rain fall "i" is therefore related to an increment "I" of increase in liquid level in the storage container by the ratio:

$$i/I = A/a = D^2/d^2$$

by way of example, the inside diameter D of the fifty-five gallon drum is 22.5" (57.15 cm) and the inside diameter d of the collector orifice 15 is 10.245" (26.02 cm). For a total liquid level increment capacity I of, for example, 12.48" (31.74 cm), the total precipitation gauge is therefore capable of measuring a total precipitation in a range of up to 60" (152.40 cm) rain fall equivalent. The total precipitation gauge is therefore well adapted for use in remote areas without tending over extended periods of time.

Figure 3:
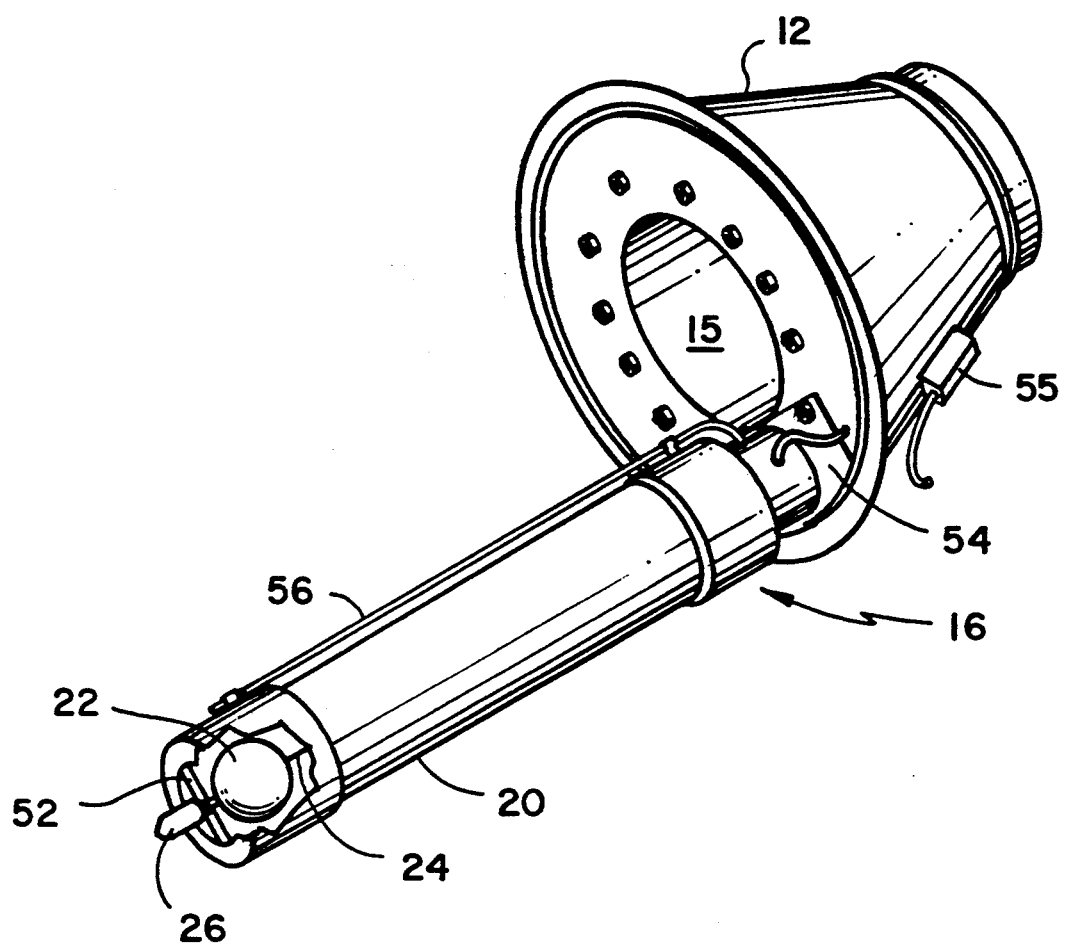
FIG. 3 is as perspective view from below of the removable and replaceable cover incorporating the total precipitation gauge elements including the collector passageway for passing precipitation and the float gauge extending downward from the cover.

As shown in FIGS. 2 & 3, the total precipitation gauge is in the configuration of the cover 12 formed with collector 15 and an elongate float gauge 16 extending downward from the cover 12. The length of the float gauge 16 assures that it extends into the base liquid level or zero liquid level 18, provided, for example, by an antifreeze liquid such as ethylene glycol. The extension or reach of the float gauge 16 is selected for operation over the desired measurement range of, for example, 60" (152.40 cm) equivalent rainfall.

The float gauge 16 is formed with an elongate stillwell 20 which extends into the base liquid level or zero liquid level of the precipitation storage container 14. The term "stillwell" is used herein to refer to an elongate annular channel, housing, or well 20 open at the lower end, and of substantially smaller diameter or width than the container 14. The open lower end of the stillwell 20 is inserted in the liquid reservoir of container 14 and provides a quiet liquid level within the stillwell 20 at the same level as in container 14. The stillwell 20 dampens wave motion or other disturbances in the larger reservoir of container 14 caused by precipitation falling into container 14 through collector 15. This assures greater sensitivity and accuracy in the cumulative precipitation signals generated by the code bearing surface and optical sensors hereafter described.

A float element 22 is suspended in the stillwell 20 for floating up and down with the liquid level in the stillwell 20 and container 14. As shown in FIG. 2, the float element 22 is suspended by a flexible tape or strip 24 secured at one end to the float element and at the other end to a spring loaded reel 25. In other words, the reel 25 and adjacent slots at the top of the stillwell 20 as shown in FIG. 2 form a guide for the other end of the strip 24. As hereafter more fully described, the weight of float element 22 is adjusted by weight ballast 26 so that the weight of the float element 22 and ballast 26 exceeds the spring force of the spring loaded reel 25. As the liquid level in container 14 rises with accumulated precipitation, the flexible strip 24 therefore winds up on the spring loaded reel 25. However if liquid level falls, for example due to evaporation, the flexible strip 24 unwinds from the spring loaded reel 25 so that the float element 22 faithfully follows the liquid level.

As shown in FIGS. 4 and 5, the flexible strip 24 is a coded strip digitally encoded with alternating opaque lands 30 and slots or relatively transparent spaces 32 of substantially equal width. The coded strip 24 passes through an optical interruption sensor 34 such as a Hewlett Packard Linear Optical Incremental Encoder Module, HEDS-9200 (TM) Series. The interruption sensor 34 incorporates first and second optical sensors each of which generates square wave or pulse electrical signals 35 corresponding to the lands and spaces of the coded strip as the strip translates relative to the optical sensors during rising and falling motion of the float element 22.

The first and second optical sensors of the optical incremental encoder module 34 are positioned in a quadrature relationship with respect to the coded strip 24, for example at positions a1 and a2 as shown in FIG. 4. Of course the optical sensors may be positioned in a quadrature relationship in different respective cycles of lands and spaces of the coded strip as shown, for example, by positions b1 and b2 also shown in FIG. 4. By this quadrature positioning, the respective square wave electrical signals generated by the first and second optical sensors are also in a quadrature phase relationship.

For a resolution in precipitation measurement of approximately 0.01" (0.254 mm), the coded strip is formed with 120 lands per inch and 120 slots or spaces per inch. With the optical sensors in quadrature relationship, i.e. 90° out of phase, the resulting square wave signals are also 90° out of phase and produce 480 distinguishable counts of 2 bits each per inch of the flexible coded strip. The count sequence when the code strip is rising for first and second optical sensors at positions a1 and a2 is set forth in TABLE I. The count sequence for a falling code strip is set forth in TABLE II.

TABLE I

| Code Strip Rising | |
|---|---|
| a1 | a2 |
| 0 | 0 |
| 0 | 1 |
| 1 | 1 |
| 1 | 0 |

TABLE II

| Code Strip Falling | |
|---|---|
| a1 | a2 |
| 0 | 0 |
| 1 | 0 |
| 1 | 1 |
| 0 | 1 |

For a total precipitation gauge, count combinations in the rising direction provide precipitation measurements in increments of approximately 0.01" (0.254 mm) while count combinations in the falling direction are ignored.

An example spring loading of the code strip reel 25 is illustrated in FIG. 6. The axle 40 of code strip reel 25 is coupled to a Negator (TM) spring 42 consisting of first and second rollers or wheels 44,45 driven by a constant torque strip power spring 46 which provides a constant bending moment and torque over the measurement range of the float gauge. Such a Negator (TM) spring is available from Hunter Spring Company.

FIG. 7 shows a detailed view of the float element 22 suspended from flexible coded strip 24 and fitted with the weight ballast 26. The float element 22 is formed with an elongate threaded bolt 50 extending from the bottom of the float element 22. The ballast 26 is formed with a complementary threaded sleeve for screwing onto the float element 22. This provides a convenient arrangement for shipping. The ballast 26 is unscrewed and removed from the float element 22, the bolt 50 is then passed through a hole in a shipping support bar, brace or strap 52 formed at the open bottom end of the stillwell 20, and the ballast 26 is screwed back on securing and bolting the floating element 22 in a stationary position with respect to the stillwell 20. For purposes of shipping, the float gauge 16 can in turn be removed from the cover 12 by loosening the bracket 54 which secures the float gauge 16 to the cover 12.

During operation of the total precipitation gauge, the interruption optical sensor 34 generates TTL compatible electrical output signals for recording, transmission, or further processing. For example the final output electrical signals may be in the form of TTL compatible voltage levels, current signals, microprocessor compatible RS232 output signals etc. available at the junction box 55 on the side of the cover 12. Also available at junction box 55 is a temperature signal derived from temperature sensor 56 on the side of the stillwell 20 to provide correction for volumetric temperature changes.

While the invention is described with reference to particular example embodiments it is intended to cover all modifications and equivalents within the scope of the following claims.

I claim:

1. A float gauge for measuring cumulative rise of liquid level in a tank comprising:
    an elongate stillwell constructed for extending into a tank below a liquid level in the tank;
    a float element suspended in the stillwell for rising and falling motion in response to a liquid level;
    an elongate code bearing surface coupled at one end to the float element and constructed for rising and falling motion with the float element and liquid level;
    guide means coupled to the top of the stillwell and constructed for guiding the other end of the elongate code bearing surface in response to rising and falling motion of the float element;
    and a code bearing surface sensor constructed for sensing motion of the elongate code bearing surface and for generating corresponding electrical signals;
    said code bearing surface sensor being secured to the stillwell and comprising first and second optical sensors coupled in a quadrature relationship with respect to the elongate code bearing surface for generating first and second electrical signals in a quadrature phase relationship indicating whether the float element and elongate code bearing surface are rising or falling.

2. The float gauge of claim 1 wherein the elongate code bearing surface comprises a coded strip secured at one end to the float element, and wherein the guide means comprises a retractor secured to the top of the stillwell, the other end of the coded strip being secured to the retractor for retracting the coded strip when the liquid level is rising.

3. The float gauge of claim 2 wherein the coded strip is digitally encoded and formed with alternating opaque lands and relatively transparent spaces, said lands and spaces having substantially equal widths, for generating first and second electrical square wave signals by the first and second optical sensors, said first and second optical sensors being coupled in quadrature relationship with respect to the cycles of lands and spaces of the coded strip.

4. The float gauge of claim 2 wherein the retractor is a spring loaded reel for winding up the coded strip, said spring loaded reel comprising a spring having a specified spring force, wherein the float element comprises a weight ballast, the weight of the float element and ballast exceeding said spring force in the range of measurement of the float gauge.

5. The float gauge of claim 4 wherein said stillwell comprises a shipping brace (52), said ballast (26) being removable from the float element (22) and replaceable over the shipping brace to secure the float element (22) to the shipping brace (52) for shipping.

6. The float gauge of claim 2 wherein the coded strip is a flexible coded strip and wherein the retractor is a spring loaded retractor.

7. The float gauge of claim 6 wherein the spring loaded retractor comprises a spring loaded reel for winding up and unwinding the flexible coded strip in response to motion of the float element.

8. The float gauge of claim 2 wherein the retractor is a spring loaded retractor for retracting the coded strip, said spring loaded retractor comprising a spring having a specified spring force, wherein the float element comprises a weight ballast, the weight of the float element and ballast exceeding said spring force and the range of measurement of the float gauge.

9. The float gauge of claim 8 wherein said stillwell comprises a shipping brace (52), said ballast (26) being removable from the float element (22) and replaceable over the shipping brace (52) to secure the float element (22) to the shipping brace (52) for shipping.

10. The float gauge of claim 7 wherein the float gauge is constructed in the configuration of a removable and replaceable cover for fitting over a liquid storage tank, said float gauge being removable and replaceable over the liquid storage tank.

11. The float gauge of claim 10 wherein the elongate stillwell extends downward from the removable and replaceable cover configuration float gauge for immersion of the end of the elongate stillwell in a liquid level in the liquid storage tank.

12. The float gauge of claim 10 wherein the removable and replaceable cover configuration float gauge is constructed with a collector for passing liquid into a liquid storage tank wherein the collector comprises a first cross section area opening less than a second cross section area of a liquid storage tank over which the removable and replaceable cover configuration float gauge may be fitted.

* * * * *